United States Patent
Willig et al.

(10) Patent No.: US 7,525,229 B1
(45) Date of Patent: Apr. 28, 2009

(54) HYSTERESIS-START PERMANENT MAGNET MOTOR

(75) Inventors: Reinhardt L. Willig, Maynard, MA (US); Donald C. Fyler, Needham, MA (US); William P. Kelleher, Acton, MA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/002,856

(22) Filed: Dec. 12, 2007

(51) Int. Cl.
*H02K 21/12* (2006.01)
*H02K 1/22* (2006.01)
(52) U.S. Cl. .................... 310/156.03; 310/261
(58) Field of Classification Search ............ 310/156.03, 310/156.31, DIG. 2
See application file for complete search history.

(56) References Cited

U.S. PATENT DOCUMENTS

| | | | |
|---|---|---|---|
| 2,784,331 A | 3/1957 | Rodemann | |
| 4,433,260 A * | 2/1984 | Weisbord et al. | 310/156.03 |
| 5,187,401 A | 2/1993 | Rahman | |
| 7,397,159 B2 * | 7/2008 | Yoshinaga | 310/156.47 |
| 2003/0120157 A1 * | 6/2003 | Fukui et al. | 600/484 |

* cited by examiner

*Primary Examiner*—Scott B. Geyer
*Assistant Examiner*—Terrance Kenerly
(74) *Attorney, Agent, or Firm*—John Tarlano

(57) ABSTRACT

A hysteresis-start permanent magnet rotor having a non-magnetic rotor shaft, a permanent magnet rigidly attached to a center portion of the non-magnetic rotor shaft, a non-magnetic spacer on each side of the permanent magnet, each non-magnetic spacer rigidly attached to the non-magnetic rotor shaft, to form a non-magnetic spacer-permanent magnet-non-magnetic spacer combination, a hysteresis ring on each side of the non-magnetic spacer-permanent magnet-non-magnetic spacer combination, each hysteresis ring being rigidly attached to the non-magnetic rotor shaft. A stator-segment is around each of the hysteresis rings and a stator-segment is around the permanent magnet, each stator-segment separated from a next stator-segment by a non-magnetic spacer.

3 Claims, 9 Drawing Sheets

HYSTERESIS-START PERMANENT MAGNET MOTOR

In U.S. Pat. No. 2,784,331, a rotor of a motor, has a single hysteresis ring and a single permanent magnet. The hysteresis ring is rotatably attachable to a rotor shaft of the rotor. The hysteresis ring has extensions that engage a pin on the permanent magnet, during start-up of the motor of the '331 patent.

The presently disclosed hysteresis-start permanent magnet motor has a balanced rotor. The rotor has two hysteresis rings, two non-magnetic spacers and a central permanent magnet. The two hysteresis rings, two non-magnetic spacers and the permanent magnet are all rigidly attached to a rotor shaft of the rotor. A non-magnetic spacer is positioned on the rotor shaft between each hysteresis ring and the permanent magnet. The center of each hysteresis ring is equidistant from the longitudinal center of the rotor shaft. The rotor is symmetrical with respect to its longitudinal center. The center of the permanent magnet is located at the longitudinal center of the rotor shaft. A symmetrically balanced rotor, for use in the hysteresis-start permanent-magnet motor, is formed. The disclosed motor has a high pull-out torque. Further, the balance of the rotor prevents wobble to either side of the longitudinal center of the rotor.

The disclosed hysteresis-start permanent-magnet motor also has a segmented stator assembly The segmented stator assembly has three stator-segments. A separate stator-segment is positioned around each hysteresis ring and around the permanent magnet. A separate circular set of stator coils is located on each of the three stator-segments. Such a circular set of stator coils is located around each hysteresis ring and around the permanent magnet.

Each circular set of stator coils is separated from a neighboring circular set of stator coils by a circular non-magnetic spacer. The non-magnetic spacers separate a magnetic field produced by each of the three stator-segments. Due to a circular non-magnet spacer between each of the three circular stator-segments, a force produced on each of the hysteresis rings by a stator magnet field is separated from a force produced on the permanent magnet by a stator magnetic field.

The disclosed motor takes advantage of constant torque at startup, due to a constant force produced on each of the hysteresis rings by a separate stator-segment around each of the hysteresis rings. Further the disclosed motor takes advantage of synchronous torque during normal operation, due to a constant force produced on the permanent magnet by a separate stator-segment around the permanent magnet. The stator-segments for driving the hysteresis rings are energized by electrical currents that are not the same as the electrical current that energizes the stator-segment for driving the permanent magnet.

By using a hysteresis ring equidistant from, and on either side of, the longitudinal center of the rotor shaft, a clockwise force produced around the longitudinal center of the rotor is concealed out by a counterclockwise force produced around the longitudinal center of the rotor. These balanced forces are orthogonal to the longitudinal axis of the rotor shaft. There are no net orthogonal force produced on the longitudinal axis of the rotor shaft.

An axially segmented hysteresis-start permanent magnet motor, i.e. an axially segmented HSPM motor, is disclosed. It consists of a cylindrical rotor, having a shaft, mounted inside of laminated stator-segments. The multiple stator-segments form an axially segmented stator assembly. The rotor is also axially segmented. Features of the motor are the axial segmented rotor and axial segmented stator assembly.

In one embodiment a central permanent magnet section is flanked, axially, by two hysteresis ring sections. The matching stator assembly has three stator-segments that are aligned with the three sections in the rotor. This particular embodiment is recommended for high performance inertial instruments because the axial symmetry prevents non-symmetric thermal gradients.

The general purpose of the disclosed motor is to convert electrical power from a simple AC power source (constant voltage or current and constant frequency) to mechanical power. The motor is a self-starting, brushless, synchronous, permanent magnet motor. The motor is a hybrid motor. The disclosed motor takes advantage of hysteresis motor technology and permanent magnet motor technology.

The disclosed motor greatly improves on a wheel motor. The disclosed motor greatly improves on a conventional induction-start permanent-magnet motor (ISPM motor).

This improvement resulted in a hysteresis-start permanent magnet motor (HSPM motor). Three major changes were made during this improvement. First, the rotor was axially segmented so that two modes of operation (start-up & synchronous) could be optimized. Second, the induction motor sections (copper bars & laminations) were replaced with hysteresis rings. Third, a stator was axially segmented into three stator-segments, to complete the magnetic separation of the two modes. A hysteresis-start permanent magnet motor (HSPM motor) was produced.

There are three general types of self-starting, synchronous, brushless motors that perform the same function:
   (1) a hysteresis motor;
   (2) an induction-start permanent-magnet motor; and
   (3) a hysteresis-start permanent magnet motor.

The last two general types of motors are hybrids (a combination of two types of motors). The last general type of motor is the type of motor of the disclosure.

In prior art hysteresis-start permanent magnet motors, a permanent magnet is poorly isolated from hysteresis material. As a consequence, the hysteresis material acts as a magnetic shunt and substantially degrades the torque producing capability of the permanent magnet.

In the motor of the disclosed invention, the permanent magnet is isolated from hysteresis rings by non-magnetic spacers.

The chief disadvantages of prior art motors of the above described general types are their relatively low synchronous efficiency and low pull-out torque compared to the disclosed motor of the same size. Disadvantages of a prior art motor, of each general type, are:

(1) Pure hysteresis motors have a relatively low efficiency and torque, because the magnetic poles created in the hysteresis material are relatively weak, compared to magnetic poles created in a present day permanent magnet.

(2) Induction-start permanent-magnet motors have a relatively low efficiency and torque, because they use space inefficiently. They require relatively large conducting rotor bars to produce enough torque to pull the rotor into synchronization and keep it synchronized.

(3) Prior art hysteresis-start permanent magnet motors have a relatively low efficiency and torque, because the permanent magnet is poorly isolated from the hysteresis material. This degrades the motor's performance in two ways. First, the hysteresis material acts as a magnetic shunt so that the permanent magnet is partially shorted. This reduces both the synchronous efficiency and pull-out torque of the motor. Second, the hysteresis material is subjected to a bias field from the permanent magnet. This reduces the amount of starting torque per unit volume, that the hysteresis material can provide.

In the disclosed motor, both forms of degradation are avoided. This is done by properly isolating the different sections, i.e. the hysteresis rings and stator-segments, and the permanent magnet and stator-segment, so that the magnetic field of each section is confined to the appropriate spatial region.

The disclosed motor differs from former motors in its structure and its performance, as follows:

{1} First, comparing a hysteresis motor with the disclosed motor, the disclosed motor has a permanent magnet in its rotor while a hysteresis motor does not. This means the torque produced by the disclosed motor is higher than that of the hysteresis motor. The synchronous torque produced by the disclosed motor is due to the magnetic field of both the permanent magnet and the magnetized hysteresis material. The synchronous torque produced by a hysteresis motor is due solely to the magnetic field of the magnetized hysteresis material. Because the magnetic field produced by the permanent magnet is larger than that of the magnetized hysteresis material, the torque produce by the disclosed motor is higher than that of the hysteresis motor. Hence, for the same size and current the disclosed motor has a higher efficiency and pull-out torque than a hysteresis motor.

(2) Next, comparing an induction-start permanent magnet motor with the disclosed motor, the induction-start permanent magnet motor requires conducting rotor bars and laminations in the rotor to develop the starting torque. Neither is required for the disclosed motor. The disclosed motor produces the starting torque using the hysteresis material in its rotor. For the same amount of starting torque the hysteresis material requires less space. In an induction-start motor, the radially deep laminations and the conducting bars take up a large fraction of the rotor volume. The disclosed motor is able to produce the required pull-in torque, with less magnetic material in the rotor. Because the disclosed motor uses space more effectively than an induction-start permanent magnet motor, it has a higher efficiency and pull-out torque.

(3) Lastly, comparing a prior art hysteresis-start permanent magnet motor with the disclosed motor, the permanent magnet is poorly isolated from the hysteresis material in the prior art hysteresis-start permanent magnet motor. Poor isolation degrades the prior art motor's performance. In the disclosed motor, the degradation is avoided because the different sections, i.e. the hysteresis ring sections and the permanent magnet section, are properly isolated and the magnetic flux of each section is confined to its own spatial region. The magnetic isolation is accomplished by axial segmentation of both a stator into three stator-segments and the use of three sections of the rotor. Because the disclosed rotor provides this magnetic isolation, the disclosed motor has a higher synchronous efficiency and a higher pull-out torque than a prior art hysteresis-start permanent-magnet motor.

Advantages of the disclosed motor over former general types of motors are:

(a) The disclosed motor has higher synchronous efficiency and higher pullout torque than a self-starting, synchronous, brushless motor of the same size. When operated closed-loop, the synchronous efficiency of the disclosed motor is greater than that of a self-starting motor, i.e. a hysteresis motor, an induction-start permanent magnet motor, or a hysteresis-start permanent magnet motor. Even when operated open-loop, the pull-out torque of the disclosed motor is greater than that of a prior art self-starting motor.

(b) The disclosed motor has higher synchronous efficiency and is easier to build than an induction-start permanent magnet motor of the same size.

(c) The disclosed motor has higher synchronous efficiency and higher pullout torque than a prior art hysteresis-start permanent magnet motor of the same size.

Features of the disclosed motor are the segmentation of the rotor and segmentation of the stator. In the case of cylindrical machines with a radial gap, the segmentation is along the axial direction, as shown in FIG. 2. This feature makes the efficiency and pull-out torque of the disclosed motor better than other self-starting motors. When operated closed-loop, the efficiency of the disclosed motor is greater than that of other self-starting motors. When operated open-loop, the pull-out torque is greater than that of other self-starting motors.

Commercial applications of the disclosed motor could include those applications that need a reliable, self-starting, constant-speed, high performance (high efficiency and high torque per unit volume) motor. Examples of applications are: accelerometers, gyroscopes, electric shuttle cars, and MEMS motors.

A disk shaped axial-gap hysteresis-start permanent magnet motor that uses the disclosed motor design should be uniquely suited to MEMS applications. First, the disk geometry is well suited to planar construction. Second, it provides the best features of both a hysteresis motor and a permanent magnet motor. Permanent magnet motors are the most efficient and powerful motors per unit volume. However, because they are not self-stating they require a controller and an encoder. A controller is necessary to start the motor and keep the rotor moving in phase with the stator field. These and other accessories are not readily compatible with a MEMS approach. Sensorless methods, like those that use the motor's back emf, are not feasible because the signal from a MEMS stator is too small. A hysteresis motor, on the other hand, is self-starting and has its own synchronizing torque. It does not need a controller or encoder.

The disclosed hysteresis-start permanent magnet motor provides the simplicity of a hysteresis motor and the high torque capability of a permanent magnet motor.

SUMMARY OF THE INVENTION

A hysteresis-start permanent magnet motor comprising a non-magnetic rotor shaft, a permanent magnet rigidly attached to a center portion of the non-magnetic rotor shaft, a non-magnetic spacer on each side of the permanent magnet, each non-magnetic spacer rigidly attached to the non-magnetic rotor shaft, to form a non-magnetic spacer-permanent magnet-non-magnetic spacer combination, a hysteresis ring on each side of the non-magnetic spacer-permanent magnet-non-magnetic spacer combination, each hysteresis ring being rigidly attached to the non-magnetic rotor shaft, and a stator segment around each of the hysteresis rings and a stator-segment around the permanent magnet, each stator-segment separated from a next stator-segment by a non-magnetic spacer.

DESCRIPTION OF THE PREFERRED EMBODIMENT

Figure 1:
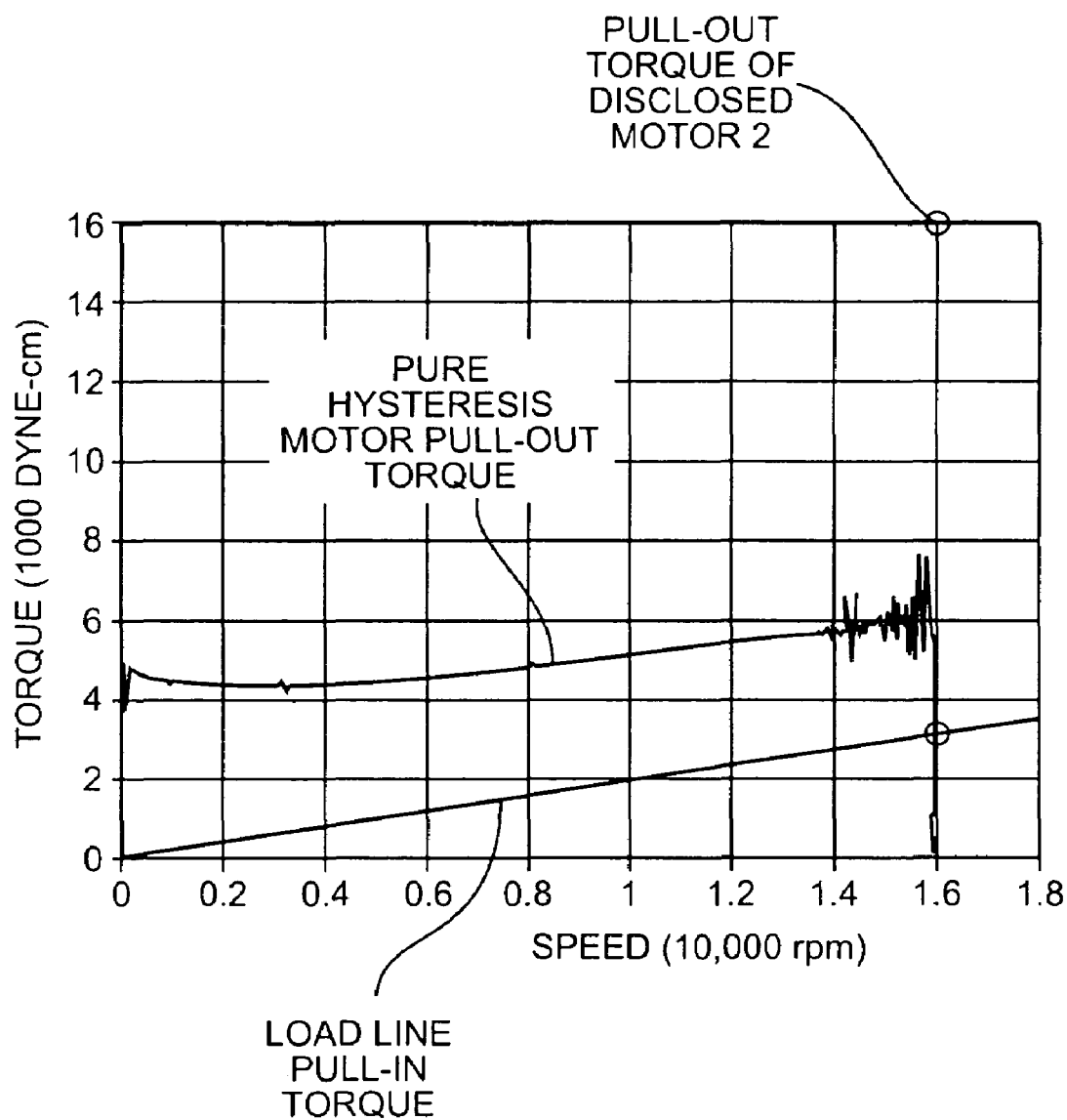
FIG. 1 is a graph of behavior of a rotor having two hysteresis rings and a central permanent magnet, the rotor being driven by an unsegmented stator.
Figure 2:
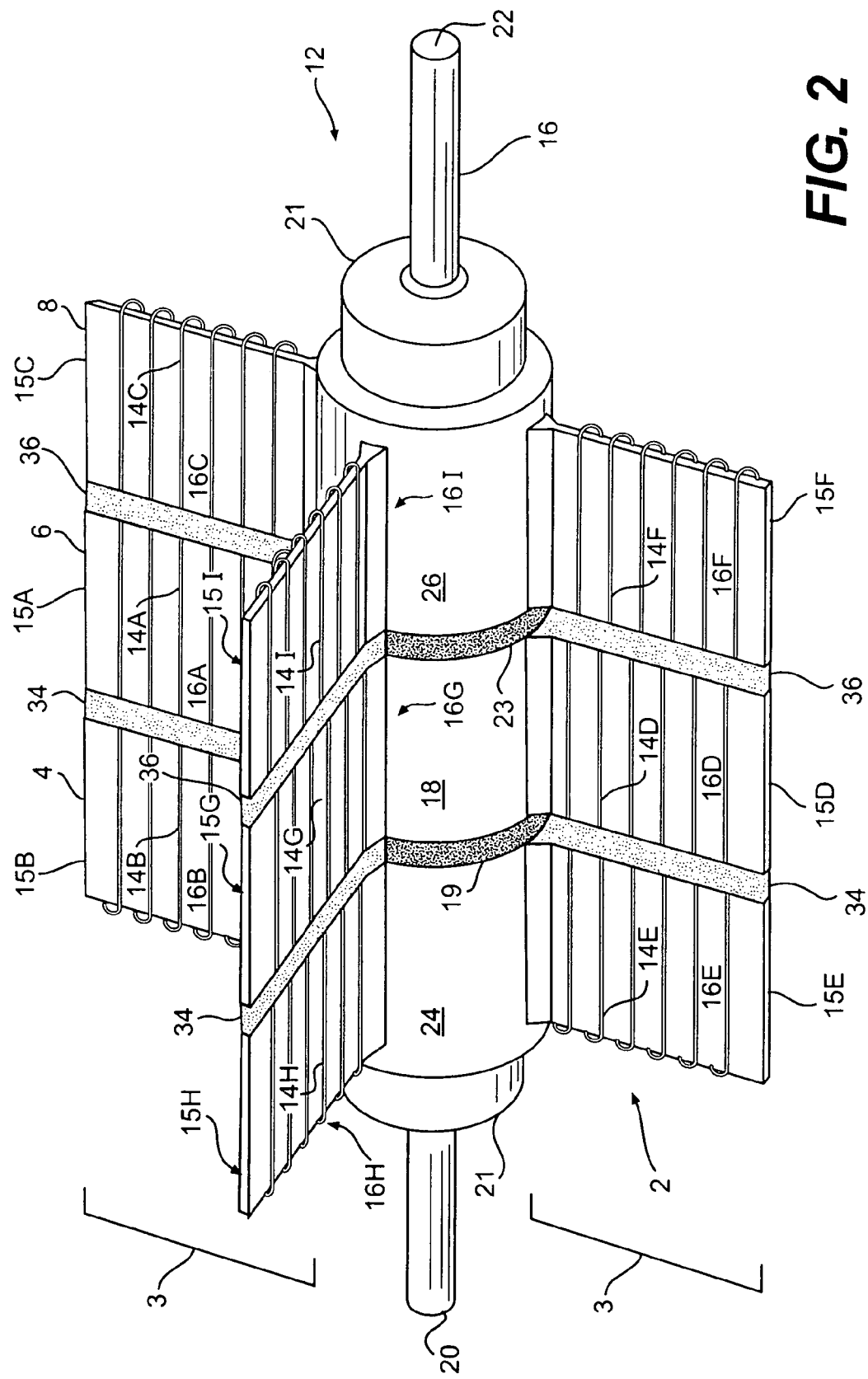
FIG. 2 is a perspective view of a segmented stator assembly around a rotor having two hysteresis rings and a central permanent magnet.

FIG. 1 shows a pull-out torque value for hysteresis-start permanent magnet motor 2 of FIG. 2. The pull-out torque value for the motor 2, over that of a pure hysteresis motor, is shown in FIG. 1. The maximum synchronous torque value for motor 2 is the same as the pull-out torque value. The pull-out torque value for motor 2 is much larger than the pull-in torque value for motor 2. The synchronous speed for motor 2 is 16,000 rpm.

Figure 3:
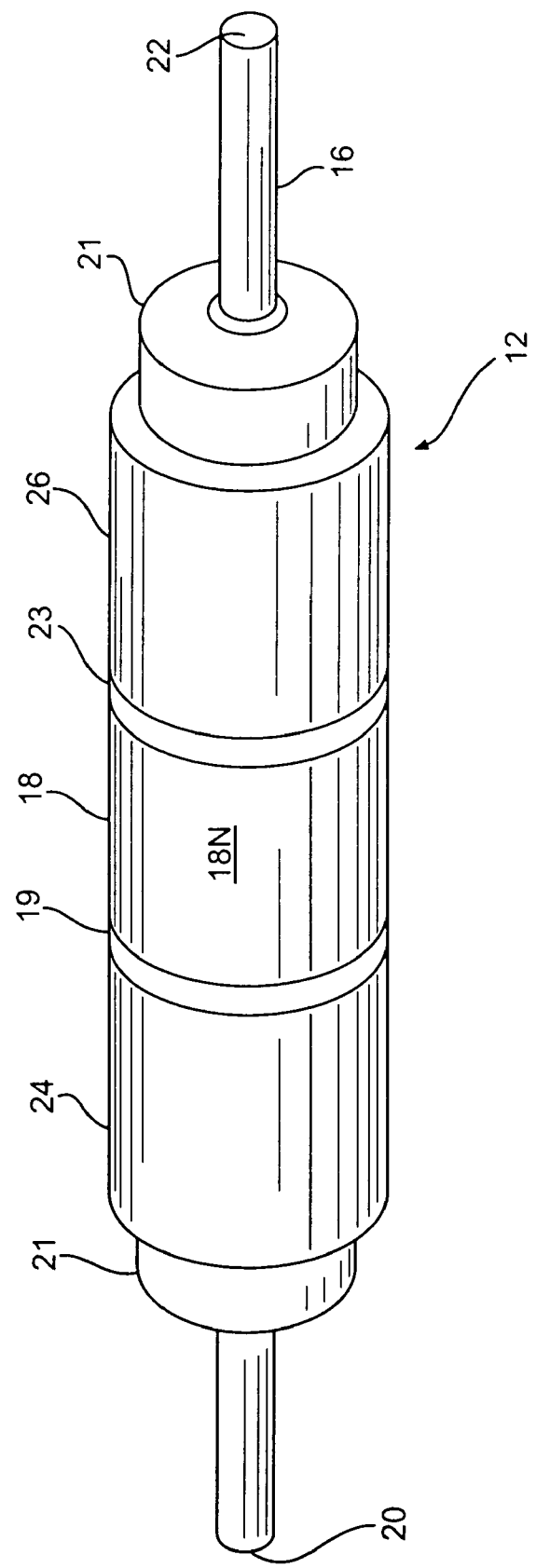
FIG. 3 is a perspective view of a rotor having two hysteresis rings and a central permanent magnet.

Motor 2 has a half-inch diameter hysteresis-start permanent magnet rotor 12. The rotor 12 is also shown in FIG. 3. The rotor 12 is segmented.

In FIG. 3, a cylindrical permanent magnet 18 of rotor 12 is connected to non-magnetic cylindrical base 21. The longitudinal center of cylindrical permanent magnet 18 is located on cylindrical base 21 at the longitudinal center of cylindrical rotor 12. The permanent magnet 18 has north magnetic pole 18N, as shown. A south magnetic pole (not shown) is in permanent magnet 18. The south magnet pole is on the opposite side of permanent magnet 18 from north magnet pole 18N.

In FIG. 3, a cylindrical non-magnetic spacer 19 is connected to non-magnetic base 21. The non-magnetic spacer 19 is located next to cylindrical permanent magnet 18 and toward end 20 of rotor shaft 16. A cylindrical non-magnetic spacer 23 is connected base 21. The non-magnetic spacer 23 is located next to permanent magnet 18 and toward end 22 of rotor shaft 16. The spacers 19 and 23 are firmly attached to base 21.

The rotor 12 of motor 2 is driven by a segmented stator assembly 3 of FIG. 2. The motor 2 is constructed of a combination of a disclosed segmented stator assembly 3 and segmented rotor 12. The motor 2 uses a current supply FIG. 2 shows portions of a hysteresis-start permanent magnet synchronous motor 2. The hysteresis-start permanent magnet motor 2 has a central cylindrical rotor 12 and three shown stator-segments 4, 6 and 8 of a segmented stator assembly 3. Stator poles 15A, 15D and 15G of stator-segment 6 are shown. Stator poles 15B, 15E and 15H of stator-segment 4 are shown. Stator poles 15C, 15F and 15I of stator-segment 8 are shown.

Stator pole 15A holds stator coil 14A. Stator pole 15B holds stator coil 14B. Stator pole 15C holds stator coil 14C. Stator pole 15D holds stator coil 14D. Stator pole 15E holds stator coil 14E. Stator pole 15F holds stator coil 14F. Stator pole 15G holds stator coil 14G. Stator pole 15H holds stator coil 14H. Stator pole 15I holds stator coil 14I.

Three shown stator poles 15A, 15D and 15G of stator-segment 6 has stator bars 16A, 16D and 16G, respectively. Stator coils 14A, 14D and 14G are wound around stator bar 16A, 16D and 16G, respectively.

Three shown stator poles 15B, 15E and 15H of stator-segment 4 has stator bars 16B, 16E and 16H, respectively. Stator coils 14B, 14E and 14H are wound around stator bars 16B, 16E and 16H, respectively.

Three shown stator poles 15C, 15F and 15I of stator-segment 8 has stator bars 16C, 16F and 16I, respectively. Stator coils 14C, 14F and 14I are wound around stator bars 16C, 16F and 16I respectively.

FIG. 2 shows segmented cylindrical rotor 12. Longitudinal central axis of non-magnetic rotor shaft 16 is located on longitudinal central axis of rotor 12. A non-magnetic cylindrical base 21 is connected to non-magnetic shaft 16.

Figure 4:
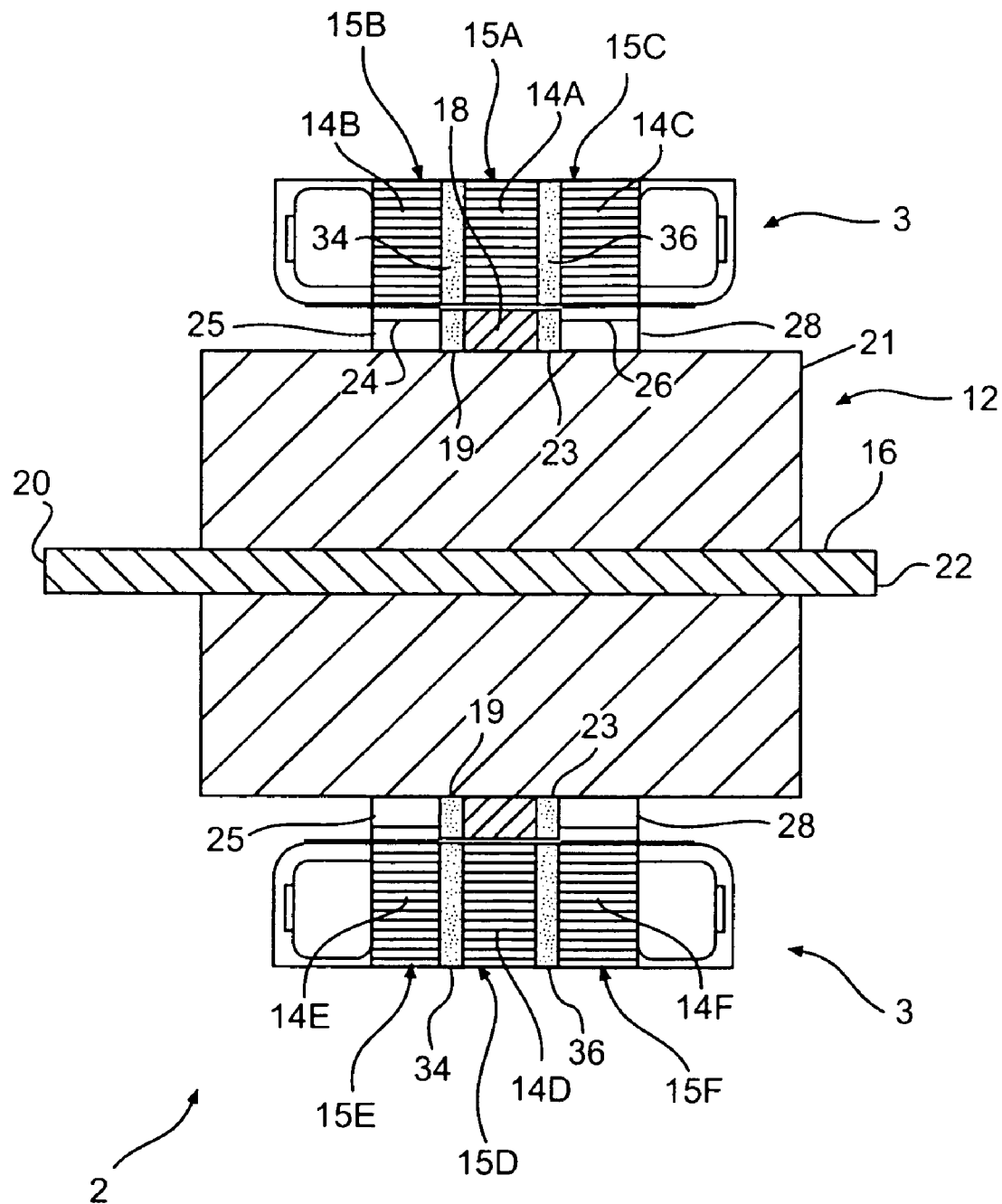
FIG. 4 is a sectional front view of a segmented stator assembly, and a segmented rotor.

In FIG. 4, a non-magnetic cylindrical base 25 is connected to non-magnetic base 21. A side of non-magnetic spacer 19 that is closer to end 20 of shaft 16 than to end 22 of shaft 16. A non-magnetic cylindrical base 28 is connected to non-magnetic base 21. A non-magnetic spacer 23 that is closer to end 22 of shaft 16 than to end 20 of shaft 16.

A cylindrical hysteresis ring 24 is connected to non-magnetic cylindrical base 25. The non-magnetic base 25 is connected to nonmagnetic base 21 so that cylindrical hysteresis ring 24 is located next to non-magnetic space 19. The hysteresis ring 24 is rigidly attached to base 25. The hysteresis ring 24 is around rotor shaft 16.

A cylindrical hysteresis ring 26 is connected to non-magnetic cylindrical base 28. The non-magnetic base 28 is connected to non-magnetic base 21 so that cylindrical hysteresis ring 26 is located next to non-magnetic spacer 23. The hysteresis ring 26 is rigidly attached to base 28. The hysteresis ring 26 is around rotor shaft 16.

The hysteresis rings 24 and 26 are made of a material that exhibits magnetic hysteresis loop characteristics.

Permanent magnet 18 is attached to non-magnetic base 21. Permanent magnet 18 is located between non-magnetic spacer 19 and non-magnetic spacer 23.

Non-magnetic spacers 34 and 36, within stator 3, are shown. Spacer 34 is between stator segments 4 and 6. Spacer 36 is between stator segments 6 and 8.

In FIG. 2, stator coils, that include stator coils 14A, 14D and 14G, drive permanent magnet 18 during normal synchronous operation of motor 2. Stator coils, that include stator coils 14B, 14E and 14H, drive hysteresis ring 24 during start-up of hysteresis-start permanent magnet motor 2. Stator coils, that include stator coils 14C, 14F and 14I, drive hysteresis ring 26 during start-up of hysteresis-start permanent magnet motor 2.

In FIG. 4, stator coils, that include stator coils 14A and 14D, drive permanent magnet 18 during normal synchronous operation of motor 2. Stator coils, that include stator coils 14B and 14E, drive hysteresis ring 24 during start-up of hysteresis-start permanent magnet motor 2. Stator coils, that include stator coils 14C and 14F, drive hysteresis ring 26 during start-up of hysteresis-start permanent magnet motor 2.

Figure 5A:
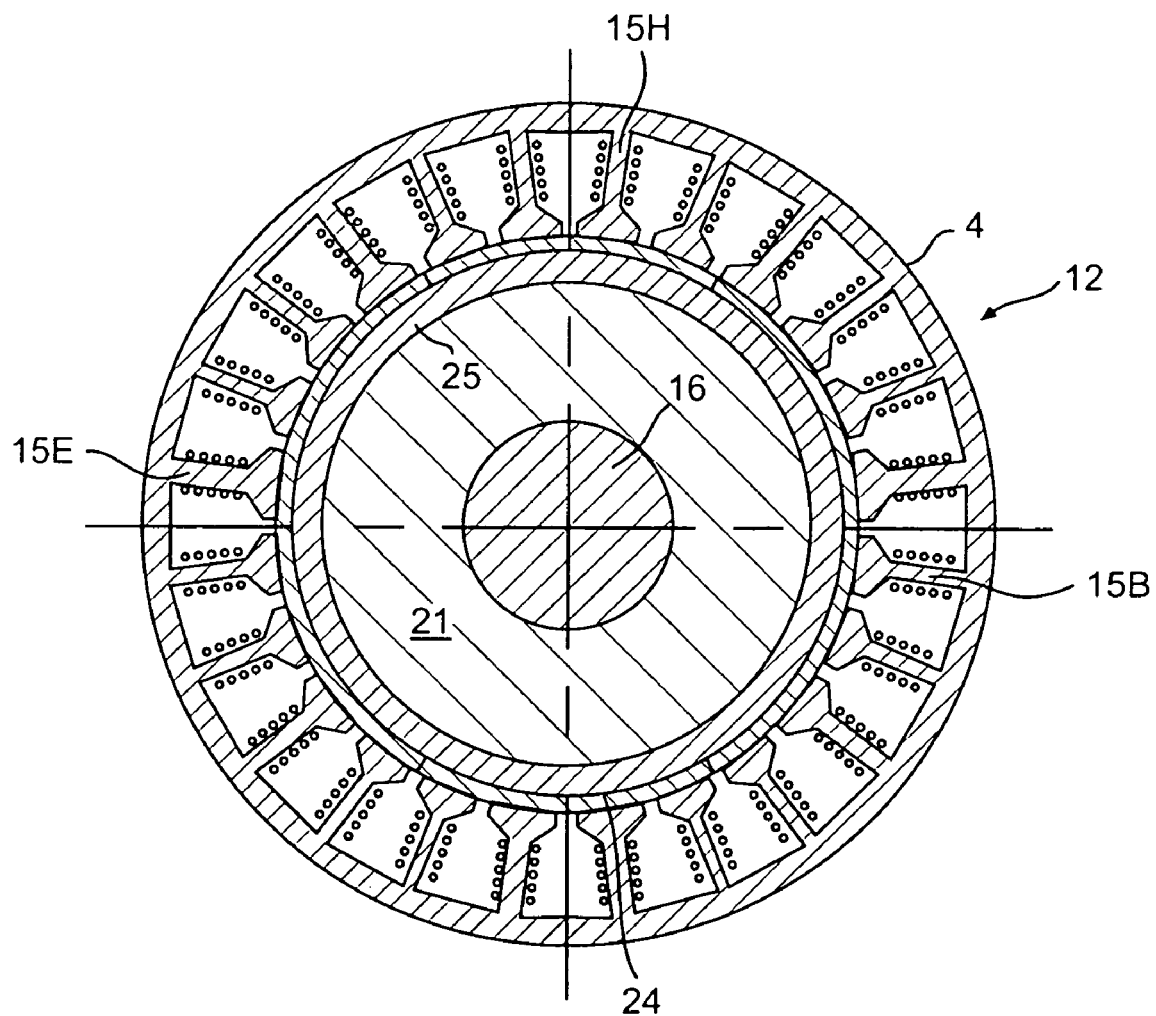
FIG. 5A is a sectional longitudinal view of both a stator segment, of a segmented stator assembly, and a first hysteresis ring of a rotor.

FIG. 5A is a sectional view of hysteresis-start permanent magnet motor 2 taken through hysteresis ring 24. FIG. 5A shows a complete set of stator poles, including stator poles 15B, 15E and 15H, of stator-segment 4. Hysteresis ring 24, base 25, base 21 and rotor shaft 16 of rotor 12 are shown within stator-segment 4.

Figure 5B:
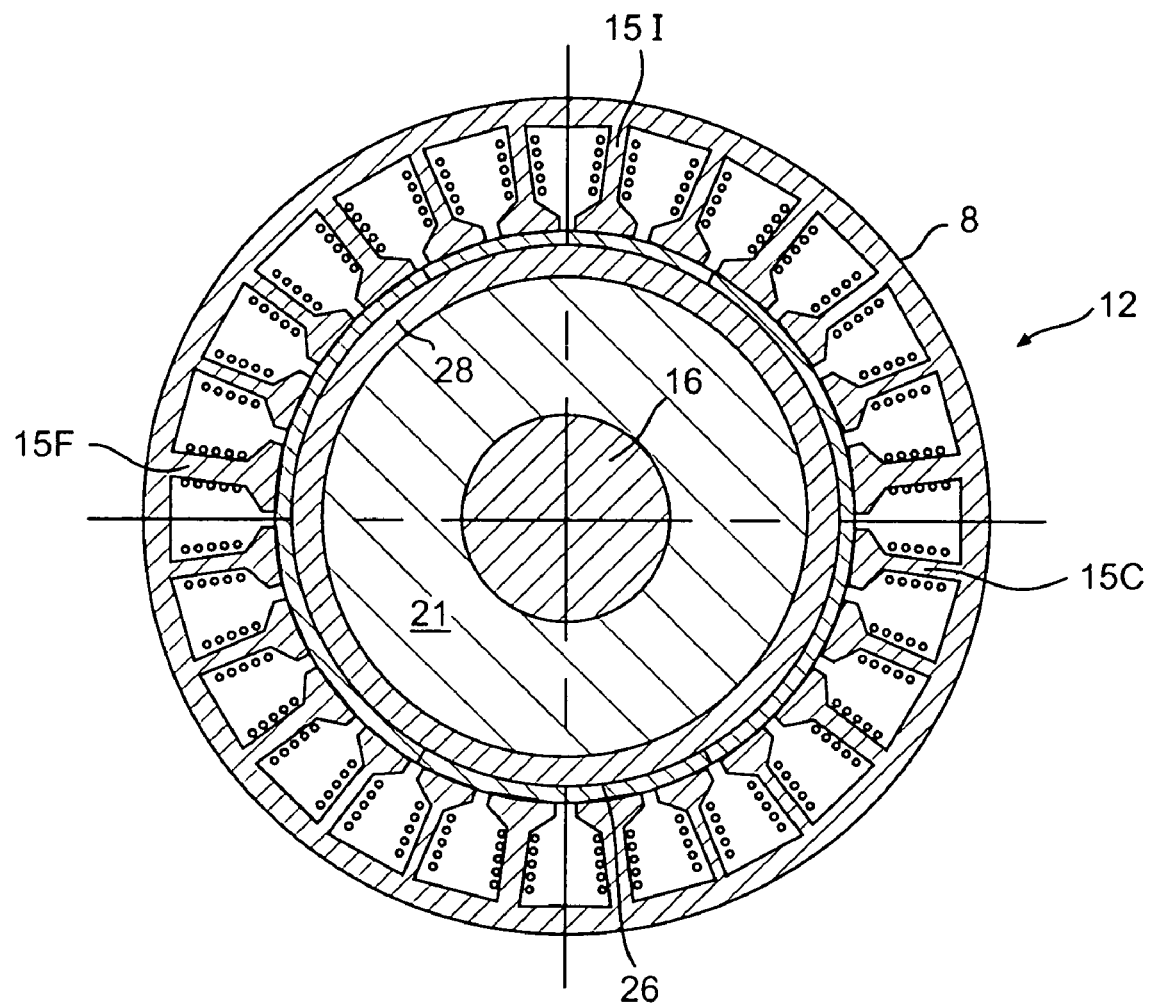
FIG. 5B is a sectional longitudinal view of both a stator segment, of a segmented stator assembly, and a second hysteresis ring of a rotor.

FIG. 5B is a sectional view of hysteresis-start permanent magnet motor 2 taken through hysteresis ring 26. FIG. 5B shows a complete set of stator poles, including stator poles 15C, 15F and 15I of stator-segment 8. Hysteresis ring 26, base 28, base 21 and rotor shaft 16 of rotor 12 are shown within stator-segment 8.

Figure 5C:
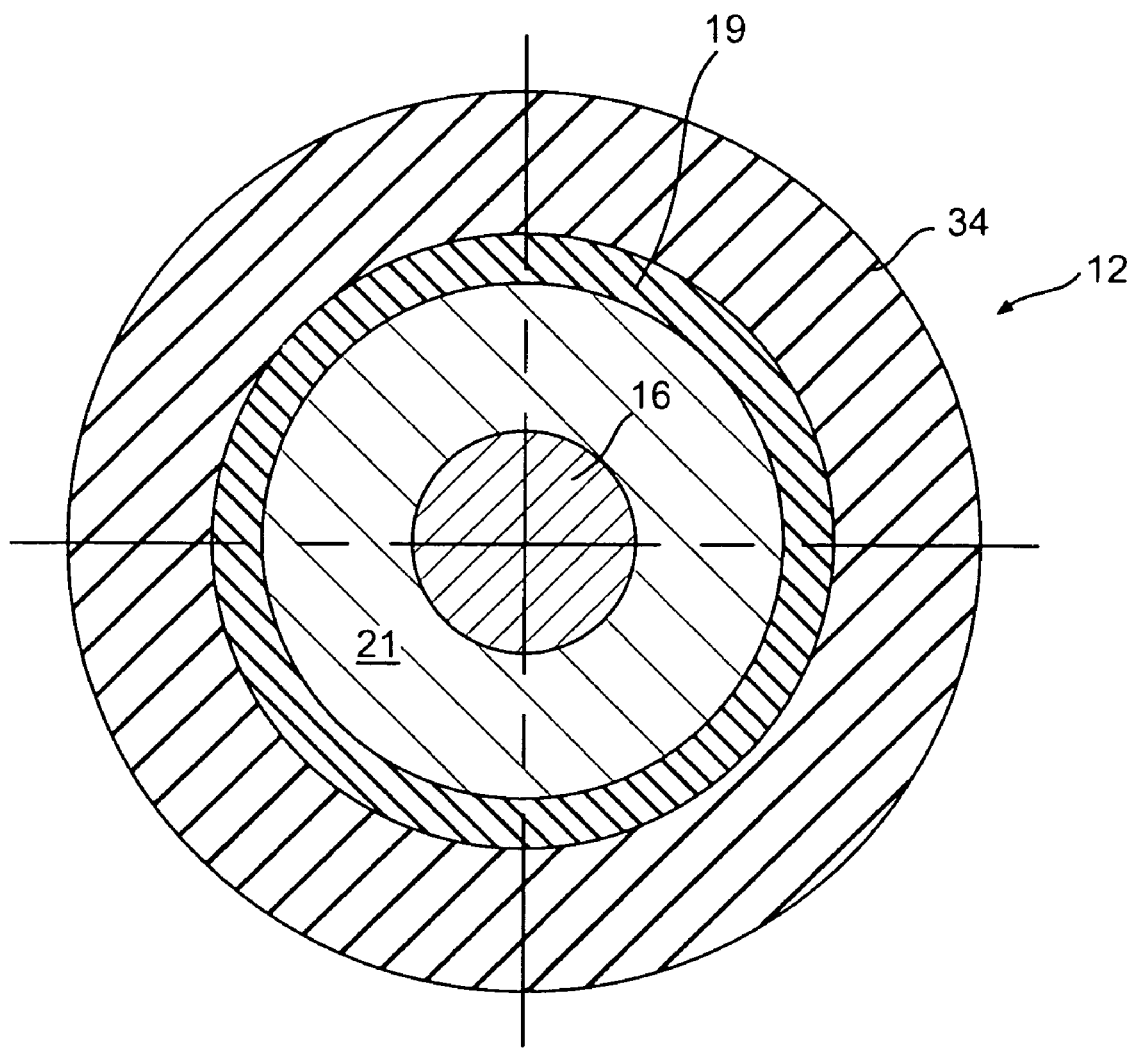
FIG. 5C is a sectional longitudinal view of a first non-magnet spacer of a segmented stator assembly and a first non-magnetic spacer of a rotor.

FIG. 5C is a sectional view of motor 2 taken through non-magnetic spacer 34 of FIG. 4. FIG. 5C shows non-magnetic spacer 34, non-magnetic spacer 19, base 21 and rotor shaft 16 of rotor 12.

Figure 5D:
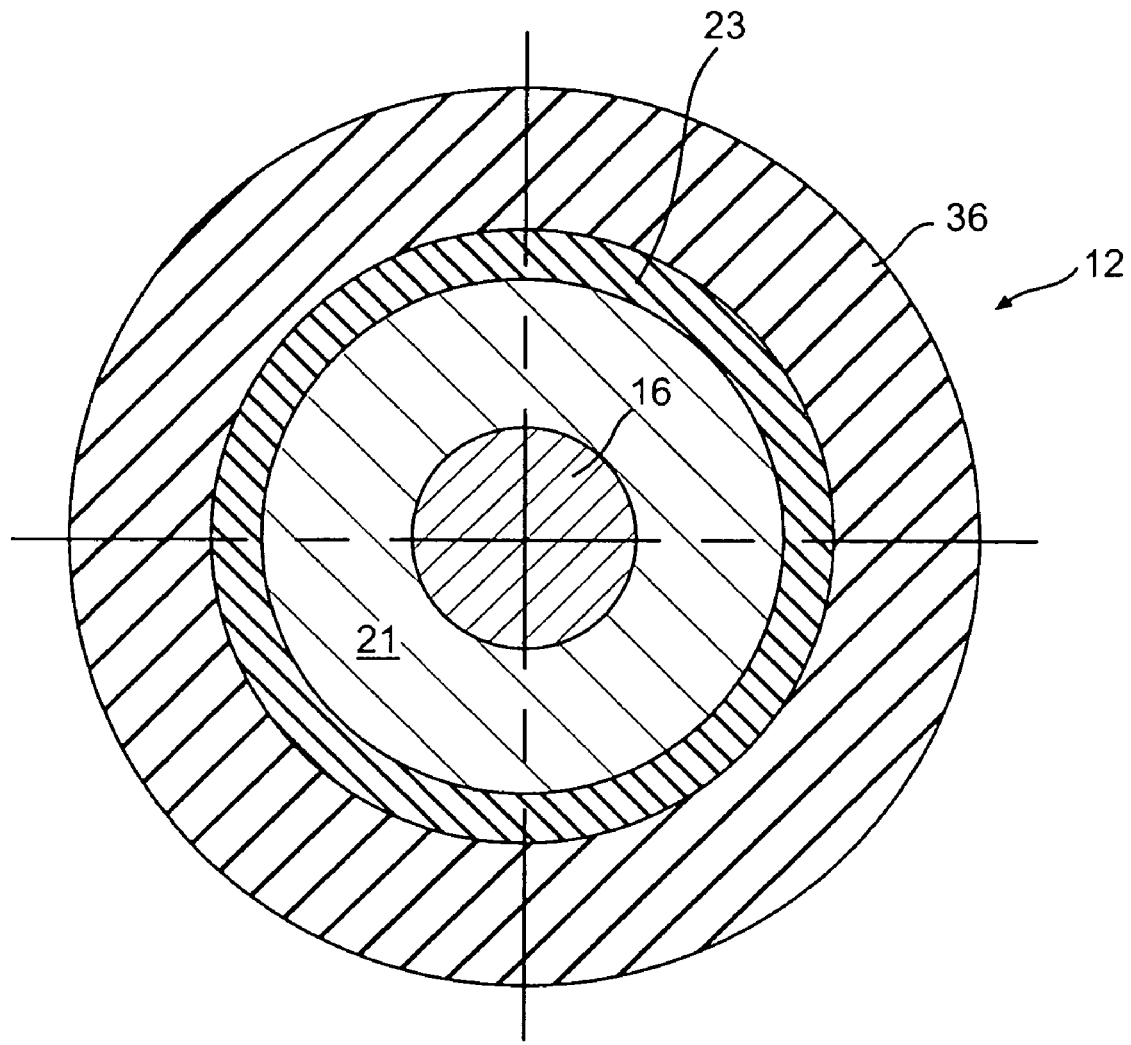
FIG. 5D is a sectional longitudinal view of a second non-magnetic spacer of a segmented stator assembly and a second non-magnetic spacer of a rotor.

FIG. 5D is a sectional view of motor 2 taken through non-magnetic spacer 36 of FIG. 4. FIG. 5D shows non-magnetic spacer 36, non-magnetic spacer 23, base 21 and rotor shaft 16 of rotor 12.

Figure 5E:
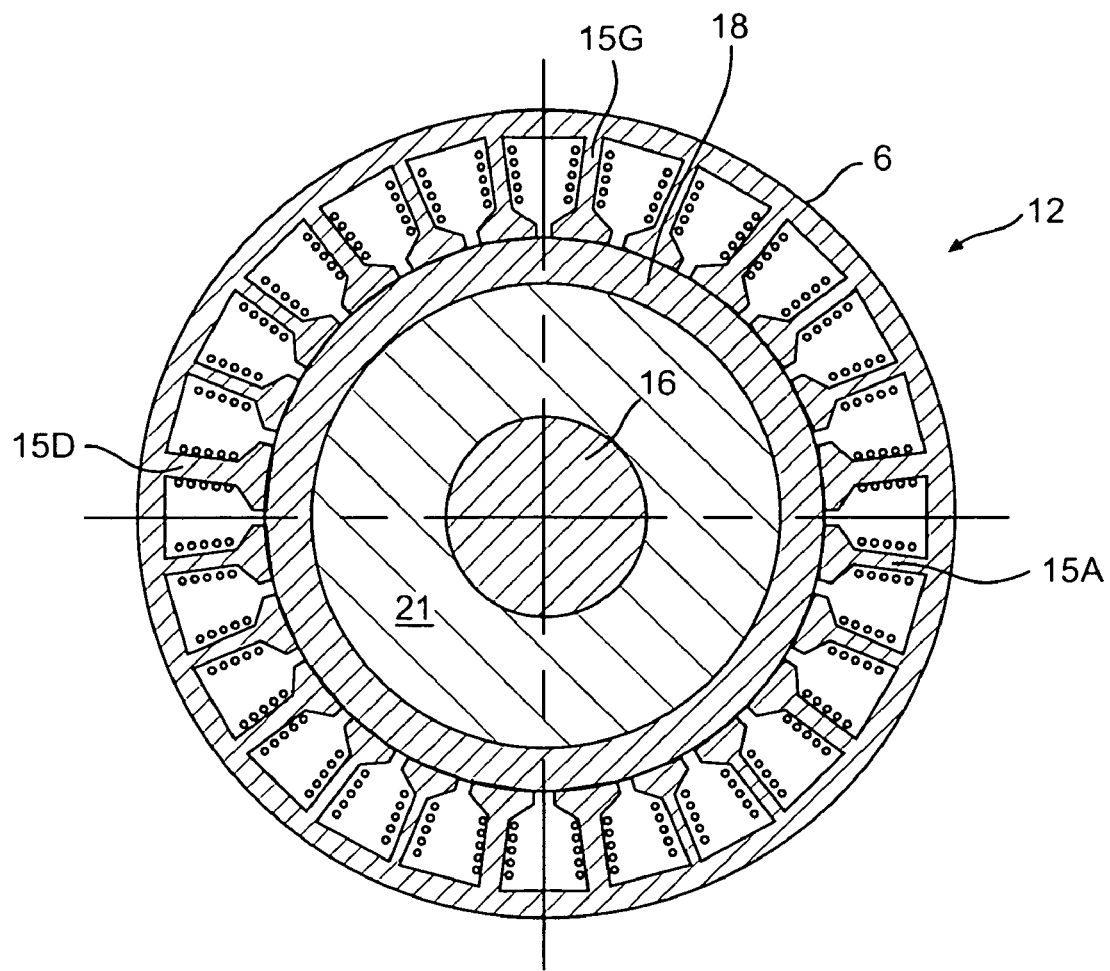
FIG. 5E is a sectional longitudinal view of both a stator segment, of a segmented stator assembly, and a permanent magnet of a rotor.

FIG. 5E is a sectional view of hysteresis-start permanent magnet motor 2 taken through permanent magnet 18 of FIG. 4. FIG. 5E shows a complete set of stator poles, including stator poles 15A, 15D and 15G, of stator-segment 6. Permanent magnet 18, base 21 and rotor shaft 16 of rotor 12 are also shown within stator-segment 6.

FIGS. 2 and 4 show stator poles 15A, 15B and 15C. Stator coils 14A, 14B and 14C are wound around stator bars 16A, 16B and 16C, respectively, as shown in FIG. 2. The stator coil 14A is isolated from hysteresis rings 24 and 26 by means of two circular non-magnetic spacers 34 and 36, partially shown in FIG. 2 and FIG. 4. The non-magnetic spacer portions of spacers 34 and 36 shown in FIG. 2 and FIG. 4, are a part of non-magnetic circular spacers 34 and 36.

The stator coil 14B is isolated from permanent magnet 18 by non-magnetic spacer 34, partially shown in FIG. 2 and FIG. 4. The stator coil 14B is also isolated from hysteresis ring 26 by non-magnetic spacers 34 and 36.

The stator coil 14C is isolated from permanent magnet 18 by non-magnetic spacer section 36. The stator coil 14C is also isolated from hysteresis ring 24 by non-magnetic spacer 34.

Stator coils 14A, 14B and 14C are separated from one another by non-magnetic spacers 34 and 36, to reduce cross-coupling between the stator coils 14A, 14B and 14C and the permanent magnet 18 and hysteresis rings 22 and 24 of rotor 12. The stator coils 14A, 14B and 14C are intended to drive permanent magnet 18 and hysteresis rings 22 and 24, respectively.

FIG. 2 also shows stator poles 15D, 15E and 15F are separated by using non-magnetic circular spacers 34 and 36. Stator coils 14D, 14E and 14F are wound around stator bars 16D, 16E and 16F, respectively. The stator coil 14D is intended to only drive permanent magnet 18. The stator coil 14E is intended to only drive hysteresis ring 24. The stator coil 14F is intended to only drive hysteresis ring 26.

FIG. 2 also shows stator poles 15G, 15H and 15I. These stator poles are also separated by the non-magnetic circular spacers 34 and 36. Stator coils 14G, 14H and 14I are wound around stator bars 16G, 16H and 16I, respectively.

In FIG. 4, other stator poles are located around each of permanent magnet 18, hysteresis ring 24 and hysteresis ring 26. A stator coil is wound around a stator bar of each of these latter stator poles. These latter stator coils are the same type as stator coils 14G, 14H and 14I.

The three sets of stator coils are separated by the circular non-magnetic spacers and the three sets of stator poles are also separated by the circular non-magnetic spacers. Each stator coil will drive only the permanent magnet or hysteresis ring that is within to the stator coil. The stator coils of stator-segments 4 and 8 drive the hysteresis rings 24 and 26, respectively, during start-up of hysteresis-start permanent magnet motor 2. The stator coils of stator segment 6 drives the permanent magnet 18 during synchronous operation of hysteresis-start permanent magnet motor 2.

FIG. 4 shows a sectional view of disclosed hysteresis-start permanent magnet motor 2. Motor 2 has an axially segmented rotor 12 and an axially segmented stator 3. In FIG. 4, the two outboard sections 24 and 26 of the rotor 12 are hysteresis rings. The center section 18 is permanently magnetized.

The disclosed motor integrates a hysteresis motor portion and a permanent-magnet motor portion on the same shaft and in close proximity, without the magnetic flux from one motor element seriously degrading the performance of the other motor element. The elimination of flux degradation is done by axially segmenting the rotor 12 and stator assembly 3 with non-magnetic spacers. Both the rotor 12 and the stator assembly 3 are axially segmented to optimize the motor's performance.

A non-magnetic spacer separates adjacent sections of the hysteresis-start permanent magnet motor 2. These axial separations are essential. They minimize the degree to which the magnetic flux from one part of the hysteresis-start permanent magnet motor 2 degrades the performance of the other part. Various paths are available to the magnetic flux created by the different parts of the stator assembly 3 and the rotor 12. Most of these paths are 3-dimensional. The spacers 19, 23, 34 and 36 control where this flux goes because they determine the magnitude of the magnetic reluctance for these paths.

First, consider the non-magnetic axial spacers 19 and 23 in the rotor 12. The spacers 19 and 23 in the rotor 12 separate the permanent-magnet motor section 18 from the hysteresis motor sections 24 and 26. Increasing the axial dimension of these spacers 19 and 23 increases the magnetic reluctance of the axial path between the three rotor sections, reducing coupling flux.

Second, consider the non-magnetic axial spacers 34 and 36 in the stator assembly 3. Increasing the axial dimension of the spacers in the stator increases the magnetic reluctance of the path that goes through the stator assembly 3 from a permanent magnet motor section to a hysteresis motor section.

The size of the spacers and the design of the motor can be adjusted to optimize the starting torque, the synchronous torque, the pull-out torque and the synchronous efficiency of the motor. Two rules of thumb have been developed for selecting the optimum size of these spacers. The first rule is that the axial dimension of the spacers should be five to ten times larger than the radial air gap. The radial air gap is the distance between the rotor and the stator. The second rule is that the axial dimensions and relative axial locations of the spacers in the stator assembly 3 should match those in the rotor 12. One consequence of these rules is that the radial air gap should be as small as possible.

For an inertial instrument, the preferred embodiment of this design is that shown in FIG. 4, that is, a central permanent-magnet motor section and two hysteresis motor end sections. This provides the symmetry necessary for reducing thermal gradients in the axial direction. In general, the number and order of the sections could vary. For example, the motor could consist of a central hysteresis motor section and two permanent magnet motor end sections. Because the invention is a hybrid motor there are as many alternate designs as there are types of permanent magnet motors. This includes axial gap disk motors.

While the present invention has been disclosed in connection with the preferred embodiment thereof, it should be understood that there may be other embodiments which fall within the spirit and scope of the invention as defined by the following claims.

What is claimed is:

1. A combination of a hysteresis-start permanent magnet motor and an AC power source, comprising:

(a) a non-magnetic rotor shaft;
(b) a permanent magnet rigidly attached to a center portion of the non-magnetic rotor shaft;
(c) a non-magnetic spacer on each side of the permanent magnet, each non-magnetic spacer rigidly attached to the non-magnetic rotor shaft, to form a non-magnetic spacer-permanent magnet-non-magnetic spacer combination;
(d) a hysteresis ring on each side of the non-magnetic spacer-permanent magnet-non-magnetic spacer combination, each hysteresis ring being rigidly attached to the non-magnetic rotor shaft;
(e) a stator-segment around each of the hysteresis rings and a stator-segment around the permanent magnet, each stator-segment separated from a next stator-segment by a non-magnetic spacer, a first stator-segment being aligned with a first hysteresis ring, a second stator-segment being aligned with the permanent magnet, and a third stator-segment being aligned with a second hysteresis ring; and
(f) the AC power source for supplying a first AC electrical current to the first stator-segment, for supplying a second AC electrical current to the second stator-segment and for supplying a third AC electrical current to the third stator-segment, a current level of the first AC electrical current being equal to a current level of the third AC electrical current, the current level of the first AC electrical current being unequal to a current level of the second AC electrical current, a phase of each of the first, second and third AC electrical currents having a mutual AC electrical phase.

2. A physically balanced rotor for a hysteresis-start permanent-magnet motor, comprising:
(a) a non-magnetic rotor shaft;
(b) a solid non-magnetic cylindrical base attached to the non-magnetic rotor shaft, the solid non-magnetic cylindrical base having a longitudinal center;
(c) a permanent magnet having a longitudinal center, the permanent magnet rigidly attached to the solid non-magnetic cylindrical base, the longitudinal center of the permanent magnet attached at the longitudinal center of the solid non-magnetic cylindrical base;
(d) a non-magnetic spacer on each side of the permanent magnet, each non-magnetic spacer rigidly attached to the solid non-magnetic cylindrical base, to form a non-magnetic spacer-permanent magnet-non-magnetic spacer combination;
(e) a base for a hysteresis ring on each side of the non-magnetic spacer-permanent magnet-non-magnetic spacer combination, each base for a hysteresis ring being rigidly attached to the solid non-magnetic cylindrical base; and
(f) a hysteresis ring on each side of the non-magnetic spacer-permanent magnet-non-magnetic spacer combination, each hysteresis ring being rigidly attached to a base for a hysteresis ring, the hysteresis rings being equal in length, a longitudinal center of each hysteresis ring being an equidistance from the longitudinal center of the solid non-magnetic cylindrical base, a physically balanced rotor being formed.

3. A combination of a hysteresis-start permanent magnet motor and an AC power source, comprising:
(a) a non-magnetic rotor shaft;
(b) a solid non-magnetic cylindrical base attached to the non-magnetic rotor shaft, the solid non-magnetic cylindrical base having a longitudinal center;
(c) a permanent magnet having a longitudinal center, the permanent magnet rigidly attached to the solid non-magnetic cylindrical base, the longitudinal center of the permanent magnet attached at the longitudinal center of the solid non-magnetic cylindrical base;
(d) a non-magnetic spacer on each side of the permanent magnet, each non-magnetic spacer rigidly attached to the solid non-magnetic cylindrical base, to form a non-magnetic spacer-permanent magnet-non-magnetic spacer combination;
(e) a base for a hysteresis ring on each side of the non-magnetic spacer-permanent magnet-non-magnetic spacer combination, each base for a hysteresis ring being rigidly attached to the solid non-magnetic cylindrical base;
(f) a hysteresis ring on each side of the non-magnetic spacer-permanent magnet-non-magnetic spacer combination, each hysteresis ring being rigidly attached to a base for a hysteresis ring, the hysteresis rings being equal in length, a longitudinal center of each hysteresis ring being an equidistance from the longitudinal center of the solid non-magnetic cylindrical base;
(g) a stator-segment around each of the hysteresis rings and a stator-segment around the permanent magnet, each stator-segment separated from a next stator-segment by a non-magnetic spacer, a first stator-segment being aligned with a first hysteresis ring for applying a first magnetic flux to the first hysteresis ring, a second stator-segment being aligned with the permanent magnet for applying a second magnetic flux to the permanent magnet, and a third stator-segment being aligned with a second hysteresis ring for applying a third magnetic flux to the second hysteresis ring, the first magnetic flux being equal to the third magnetic flux, the first magnetic flux being unequal to the second magnetic flux, and
(h) the AC power source for supplying a first AC electrical current to the first stator-segment, for supplying a second AC electrical current to the second stator-segment and for supplying a third AC electrical current to the third stator-segment, a current level of the first AC electrical current being equal to a current level of the third AC electrical current, the current level of the first AC electrical current being unequal to a current level of the second AC electrical current, a phase of each of the first, second and third AC electrical currents having a mutual AC electrical phase.

* * * * *